United States Patent [19]

Kelley

[11] 3,760,035

[45] Sept. 18, 1973

[54] RUBBER-RESIN NETWORK BLENDS AND METHOD OF MAKING SAME

[75] Inventor: Philip C. Kelley, Brecksville, Ohio

[73] Assignee: The B. F. Goodrich Company, New York, N.Y.

[22] Filed: May 12, 1971

[21] Appl. No.: 142,524

[52] U.S. Cl... 260/876 R, 117/100 C, 260/29.6 RB, 260/29.7 UA, 260/41 B, 260/45.75 K, 260/878 R, 260/881, 260/884
[51] Int. Cl.......................... C08f 37/18, C08f 15/40
[58] Field of Search..................... 260/884, 29.6 RB, 260/876 R

[56] References Cited
UNITED STATES PATENTS

| | | | |
|---|---|---|---|
| 3,644,576 | 2/1972 | Sehm | 260/897 C |
| 3,657,172 | 4/1972 | Gallagher et al. | 260/29.6 RB |
| 3,661,994 | 5/1972 | Hwa et al. | 260/879 |
| 3,290,265 | 12/1966 | Kaneko | 260/29.6 |
| 3,632,679 | 1/1972 | DeWitt | 260/878 |
| 3,291,768 | 12/1966 | Pfluger et al. | 260/29.6 |

*Primary Examiner*—John C. Bleutge
*Assistant Examiner*—John Seibert
*Attorney*—Robert W. Wilson and J. Hughes Powell, Jr.

[57] ABSTRACT

Blends of tough, rubbery, essentially completely insoluble alkyl acrylate polymer and of a hard, unplasticized vinyl chloride resin in which a very small proportion of the rubbery polymer is uniformly dispersed as a more or less continuous network are superior high impact rigid resin formulations. Such a product is produced by a two-step overpolymerization process starting in the first step with small latex particles 200-1700 A, more preferably 250 – 1250 A, and most preferably 250 – 800 A, in average diameter of a vinyl chloride seed resin and overpolymerizing on such seed resin particles a thin layer 50 – 700 A, more preferably 100 – 500 A, and most preferably 125 to 350 A, in thickness of the rubbery polyacrylate and, in the second step overpolymerizing on the first step rubber-coated latex particles additional vinyl chloride resin to produce a rubber/resin concentrate or masterbatch which is unique in its ability to be diluted, preferably in powder form, with rubber-free vinyl chloride resin to obtain a final composition containing from about 3 to about 6, more preferably 3 to 5.5 parts/wt. of rubber network material for every 100 parts/wt. of total vinyl chloride resin. The latter blended granular composition requires fluxing and fusing under shear at 350° – 440°F., more preferably about 375° to about 420°F, to develop high resistance to impact (Izod values of 10 to 20 ft.lbs/in. or more), maximized resistance to distortion by heat, maximized resistance to chemicals, and heretofore unrealized high resistance to degradation during processing and during outdoor exposure. In addition, such compositions also are unique in requiring no resinous processing aids during processing on commercial equipment. The vinyl chloride seed resin may be crosslinked, preferably with a crosslinking agent that induces the formation of graft linkages between the seed and the rubbery phases. The blends also exhibit during processing excellent high viscosity hot strength, good high temperature body and dimensional integrity, low die swell, and a somewhat lower coefficient of expansion than many other high impact resin compositions.

9 Claims, 6 Drawing Figures

INVENTOR.
PHILIP C. KELLEY
BY
ATTORNEY
Robert W. Wilson

INVENTOR
PHILIP C. KELLEY
BY

ATTORNEY
Robert W. Wilson

INVENTOR
*PHILIP C. KELLEY*
BY
ATTORNEY 3,760,035

RUBBER-RESIN NETWORK BLENDS AND METHOD OF MAKING SAME

RELATED APPLICATIONS

In the copending application of Eugene J. Sehm, Ser. No. 673,055 and the copending joint application of Eugene J. Sehm and Elmer J. DeWitt, Ser. No. 672,982 both filed Oct.5, 1967, there is disclosed blends of a vinyl chloride resin and a tough, rubbery, essentially completely gelled alkyl acrylate polymer. Such blends are shown in such applications to be prepared by adding the tough polyacrylate to the resin as highly gelled latex particles either by masticating loose crumb-like forms of the polyacrylate with the resin, by blending resin and polyacrylate latices and coagulating or spray-drying the resulting blended latices, or by over-polymerizing the vinyl chloride resin on a polyacrylate latex.

PRIOR ART

The art of polymerizing a monomeric material in the presence of a seed latex is an old one, see U.S. Pat. No. 2,520,259. This patent shows that the newly forming polymer can be compelled to deposit on the seed latex particles to the substantial exclusion of new particle initiation by means of control of emulsifier coverage on the growing latex particles. This patent, however, does not show the deposition on seed resin particles of a cross-linked or gelled, rubbery polymer.

The use of rubbery acrylate polymers as impact improvers is also known, see U.S. Pat. No. 3,251,904 wherein a rubbery alkyl acrylate polymer is given an over-polymerized coating of hard polymethyl methacrylate to form an impact improver additive to be masticated into rigid vinyl chloride resins. There is nothing in the latter patent which shows seeding of the alkyl acrylate polymer or the criticality of any specific state of dispersion of the alkyl acrylate in the rigid vinyl chloride resin. Likewise, the latter patent does not show the importance of gel in the alkyl acrylate polymer. The polymethyl methacrylate coating in the patented formulations is a processing aid which depresses the heat distortion temperatures (HDT) of the blends containing it.

Still other patents show prior art rigid resin formulations based on other rubbery ingredients and other resinous processing aids. U.S. Pat. Nos. 2,802,809 and 3,167,598, for example, show hard, resinous styrene acrylonitrile ("SAN") copolymer processing aid to have been overpolymerized on a rubbery butadiene polymer forming a composite impact improver/processing aid useful in vinyl chloride resins. In these latter products the butadiene rubber is unsaturated and a source of degradation and the over-polymerized SAN processing aid resin is a powerful depressant of HDT and a suspected source of poor chemical and outdoor exposure resistance.

BACKGROUND OF THE INVENTION

In the composition of the above-mentioned copending applications, the tough, rubbery polyacrylate ingredient is dispersed (see FIG. 4 of drawings) in the resin, even after long-continued mastication of the blend at high temperatures, as more or less uniform, rounded particles essentially corresponding to the size and shape of the latex particles in the original polyacrylate latex. It was observed that such a finely particuate style of dispersion of the polyacrylate therein was more efficient as respecting the proportions of rubber phase required for high impact than other types of dispersion (or lack of it) obtaining in theretofore known products. Usually, from about 8 to about 12 phr (parts/wt. per 100 parts/wt. of resin) of the polyacrylate latex particles seemed to be required for high impact as compared to the then standard 15 phr or more of other known rubbery or rubbery/resin impact additives.

In general, in formulating rigid vinyl chloride compositions, it has long been known that the maximized impact resistance imparted by the higher concentrations of a rubbery additive must be balanced against the need to minimize total additives and particularly rubbery additives in such composition in order to produce a rigid resin compound having highest HDT values and highest resistance to degradation by chemicals and the environment.

The rapidly expanding use of rigid vinyl chloride resins in structural applications such as rain spouting and flashing, storm window and storm door frames, shutters, house siding, and other structural products subject to continuous outdoor exposure has imposed on resin formulators stringently increased requirements on the one hand, of low cost, and on the other, of greater impact resistance and outdoor weathering resistance, less dirt and soil pickup and other discoloration, better color fastness and other visual esthetic improvements.

Known rigid resin formulations have not been completely satisfactory either with respect to cost or with respect to outdoor exposure requirements. The cost of the rubbery impact improver and resinous processing aids and the cost of their incorporation in prior art formulations are appreciable. Moreover, the rubbery additives and resinous processing additives are suspect as the cause of less than satisfactory performance by prior art rigid resin formulations on outdoor exposure. The plastics industry has a great need for better high impact rigid vinyl chloride resin formulations which not only have better resistance to the outdoor environment but which are lower in cost and are easily processed at higher temperatures and machine speeds in order to further reduce product cost.

SUMMARY OF THE INVENTION

I have disclosed that tough highly gelled polyacrylates are much more efficiently utilized in rigid vinyl chloride resin formulations when the polyacrylate is dispersed even more finely than heretofore possible by means of a two-stage over-polymerization process. In the products made by the method of this invention the tough, rubbery, essentially completely insoluble polyacrylate ingredient is shown by photomicrographs (see FIG. 3 of drawings) to be present in a novel form as more or less continuous rubber network in a matrix of hard resin whereas prior art products do not show such a structure or state of dispersion of the rubbery ingredient. The photomicrographs, to the untrained eye, appear to have a marbleized appearance of lighter colored integumentized or filamentary rubber phase uniformly distributed through a darker resin matrix. Such a unique network type structure is due to the manufacturing procedure of this invention employing seed resin. Such structure makes much more efficient use of the rubber phase than has been heretofore possible yielding very high impact resistance values at significantly lower rubber concentrations with a resulting general improvement in all other properties including environmental resistance.

It appears that at least a portion of the rubber network obtained by the use of seed or resin nuclei particles is distorted, stretched further and/or reoriented and redistributed (see FIG. 5 of drawings) during high temperature processing under shear converting it at least in part to rubbery spheres distributed uniformly throughout the resin matrix.

The network-like or marbleized distribution of the exceedingly tough, rubbery, gelled polyacrylate in the overpolymerized products of this invention as they are obtained from the reactor is unique not only in its efficiency of use of polyacrylate (high impact with less rubber phase) but also because it permits dilution of the matrix with rubberfree resin without significant loss of impact strength. This ability to be diluted allows the resin manufacturer to make polymerization products high (i.e., up to about 65 percent/wt.) in rubbery content which is then diluted or cut back with rubberfree resin to achieve maximized efficiency in polymerization reactor capacity.

The unique nature of the state of dispersion of the exceedingly tough rubbery acrylate polymer in the products of this invention is also believed responsible, in part at least, for the unique high temperature processing behaviour of these products, as follows:
1. low die swell in extrusion operations;
2. excellent high temperature hot strength;
3. excellent formability and/or sizeability and dimensional retention at the high temperatures employed in vacuum forming, roll-forming, extrusion and injection molding; and
4. a coefficient of thermal expansion generally lower than other known high impact versions of vinyl chloride resins.

In the first stage of the process of this invention, the tough highly-gelled or insoluble polyacrylate rubber is overpolymerized on small vinyl chloride resin seed latex particles from about 200 to about 1,700 A, more preferably between about 250 and about 1,250 A, and most preferably from about 250 to about 800 A in average diameter. Such first stage over-polymerization is carried out so as to deposit on and/or around the seed resin particles a thin layer or deposit of the rubber, the thickness of this layer (hereinafter called "shell thickness") being critical with respect to obtaining high impact strength at very low rubber content in the final product blend. Such shell thicknesses may be from about 50 to about 700 A or slightly more in thickness, about 50 to about 700 A or slightly more in thickness, more preferably between about 100 and about 500 A, and most preferably between about 125 and about 350 A in thickness. When the content of rubbery polyacrylate in the formulation is increased above about 6 phr as in prior art formulations, the state of dispersion or nature of dispersion appears relatively less important since fused blends at these rubber levels usually have more or less acceptable impact properties, albeit having less than desired physical and chemical properties.

Moreover, the shell thickness values and seed latex particle sizes are interrelated. Products made from seed latices containing 1,900 – 2,000 A particles do not develop acceptable impact. With seed particles in the range of 1,600 – 1,700 A in diameter about 6 phr of polyacrylate are required for high impact and this makes 1,700 A the limit on seed latex particle size because of cost factors and other properties of the blend.

As the level of polyacrylate in the blend is progressively decreased to 5, 4 and 3 phr the permissible range in shell thickness is narrowed sharply, see FIG. 1 of the drawings wherein with 400 A seed and 5 phr rubber content, shell thicknesses of about 100 to about 500 A appear usable and at 4 phr shell thicknesses of about 125 to about 350 A appear required. Since one of the main objects of this invention is to employ as little as possible of the rubber phase, the use of close control of shell thickness in the range of 125 – 350 A on seed resin particles at the lower end of the permissible range (250 – 800 A seeds) is strongly preferred and is necessary reliably to produce high (Izod of 10 – 20 ft.lbs/in. or more) impact formulations at the low levels of 3 to 6 phr of the rubbery polyacrylate ingredient.

The shell thickness values recited above correspond, on a percent by total weight basis, to the deposition on the first stage seed resin particles of between about 12% to about 99.7 percent/wt. of the gelled polyacrylate for the 50 – 700 A range of shell thicknesses on 200 – 1,700 A seed, more preferably between about 41 percent and about 99 percent/wt. for the 100 – 500 A range of shell thicknesses on 250 – 800 A seed.

In the second step of the process, the rubber-coated latex particles of the first stage are subjected to an over-polymerization with a monomeric material containing vinyl chloride to deposit a hard resin coating on or around the rubber-coated latex particles thereby to entrap and preserve in a matrix of hard resin the rubber coated nature of the first stage particles. The proportion of hard resin thus deposited is not especially critical except that at least about 35 percent/wt. thereof based on the weight of rubber-coated seed resin solids is required to produce a non-sticky product which can be handled without agglomeration. More preferably, the second stage polymerization product will contain between about 35 and about 300 percent/wt. of the hard resin deposit. Stated on another equivalent basis, the second stage polymerization product will constitute between about 3 to about 65 percent/wt., more usually from about 10 to about 25 percent/wt. of of the rubbery polyacrylate ingredient and from about 97 to about 35 percent/wt., more usually from about 90 to about 75 percent/wt., of the total hard seed and over-polymmerized matrix resins. Most preferred is a product containing between about 10 to about 20 percent/wt. of the rubber and 90 to 80 percent/wt. of the resin. The latter products can be diluted with from about 3 to about 6 times their weight of added resin to produce blends containing 3 – 6 phr of the rubber.

To illustrate the economic advantage of the preferred slurry dilution procedure, one 1,100 gallon charge of polyvinyl chloride seed resin latex at a total solids level of about 30 percent/wt. will produce a total of nearly 100,000 lbs. of dry polyvinyl chloride/polyacrylate blend containing 5 phr of rubbery, gelled polyacrylate after blending of second stage product with virgin polyvinyl chloride resin. To the latter there are added stabilizers, fillers, lubricants, etc., to produce an even greater weight of commercial powder blanks for final processing and shaping operations.

DESCRIPTION OF INVENTION

GENERAL

Figure 1:
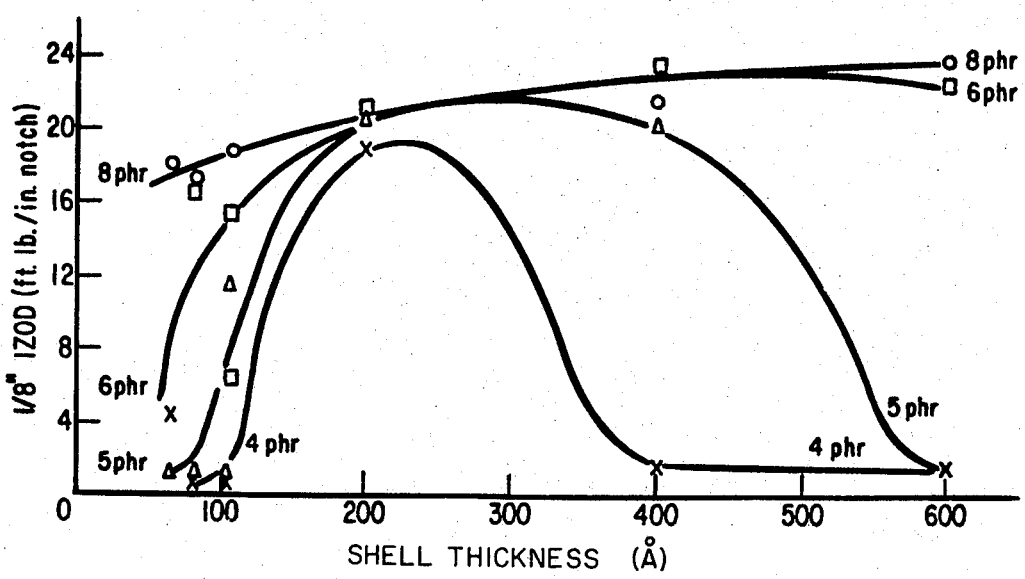
FIG. 1 is a graph presenting data on a number of compositions of this invention all made starting with a polyvinyl chloride seed resin latex in which the particles are of average diameter 400 A and varying the shell thicknesses of polyacrylate deposited in the first-stage on such seed resin latex particles, and the second stage polyvinyl chloride over-polymerized product diluted by blending with virgin polyvinyl chloride resin to yield final blends containing polyacrylate contents of 4, 5, 6 and 8 phr, the graph showing "shell thickness" in A plotted as abscissae and Izod impact values in ft.lb./in. of notch plotted as ordinates, the various curves representing the Izod values at constant indicated acrylate rubber concentration in the blend.

By the term "rigid" as applied to the products of this invention means a product having an HDT or ASTM heat distortion temperature above room temperature (i.e., above 25°C.) and preferably above about 50°C. Rigid vinyl chloride resin compositions usually have tensile strength above about 4,500 lbs./sq.in. whereas semi-rigid and flexible formulation have lower tensile strength. Flexible resin formulations are not thought of in terms of their impact strength since their ready extensibility and flexibility make it difficult to determine their Izod impact value.

By the term "rubbery" as respects the polyacrylate ingredient is meant an elastomeric nature by means of which the polyacrylate is capable of being elongated by at least 100 percent and which when released will return essentially to its original length.

By the term "essentially completely gelled" or "highly gelled," as applied to the rubbery polyacrylate ingredient, is meant a material which per se exhibits a solubility in toluene at room temperature (25°C.) of less than about 20 percent/wt. Stated another way, one can extract less than about 20 percent/wt. of the rubber by extraction at room temperature with toluene employing an ultra-centrifuge technique. The preferred polyacrylate evidences such a solubility in toluene to the extent of less than about 10 percent, most preferably below about 5 percent/wt., and most commonly below about 3 percent/wt. It is not practical to employ the usual "sol-gel" Soxhlet-type of extraction procedure common in the synthetic rubber industry with such a highly insoluble or gelled rubber because the screens of the Soxhlet extraction cups do not retain micro-gels. Rather, it is necessary to disperse the rubber in toluene for a period of time and then separate the liquid from the total gel (macro-gel and micro-gel) in an ultra-centrifuge and back-calculate the percent insolubles based on a dissolved solids analysis of the recovered liquid.

It is implicit that such tough, rubbery polyacrylates must be prepared without significant proportions of polymerization modifiers or chain-terminators such as alkyl mercaptans in order to obtain a uniformly highly insoluble polymer.

By the terms "polymerization in aqueous dispersion" or "over-polymerization in aqueous dispersion" is meant a latex-style polymerization of monomeric material emulsified or colloidally dispersed in water. Such a polymerization usually employs a water-soluble catalyst such as potassium persulfate and one or more water-soluble dispersing agents such as sodium benzene sulfonate, sodium lauryl sulfate, or sodium laurate, etc. As applied to an "over-polymerization in aqueous dispersion," as in steps 1 or 2 of the process of this invention, the term means a polymerization in aqueous dispersion which proceeds by deposition of polymer on seed resin latex particles to the substantial exclusion of new particle initiation and without coagulation of latex particles to produce a latex of uniform particle size and free of coagulum in which the original seed resin particles are present coated with the over-deposited polymer.

The term "over-polymerization in aqueous suspension" as respecting one of the alternate modes useful in second stage of the process means a polymerization which commences in the presence of latex particles or of a suspension of finely granular polymer containing latex particles and proceeds with the gradual disappearance of the original latex or granular phase and the appearance of a suspension of macro-granular resinous particles which readily settles out on standing and which is easily filtered to separate solid and liquid phases. Such a polymerization requires (1) a catalyst appreciably soluble in the monomer phase but exhibiting relatively little solubility in water, thereby to suppress new particle initiation in the aqueous phase, and (2) a colloidally active polymerization suspension agent such as polyvinyl alcohol to stabilize the granular suspension as it forms and eliminate agglomeration and solids deposition.

In the description to follow, there will be recited average diameters of latex particles expressed in A. Such sizes are as calculated based on a standard soap titration determination. Likewise, "shell thickness" values for the polyacrylate coating on the seed resin latex particles are as similarly calculated based again on standard soap titration values and subtracting the original average radius of the seed resin latex particles from the radius of the larger particle as determined by soap titration to arrive at a calculated "shell thickness value." Such calculation of particle sizes and shell thickness values are based on assumed perfectly spherical latex particles all of the same average size, which they are not, and therefore such calculated values are believed not absolutely accurate. Such errors as may be present, however, appear to be consistent. Within a series of determinations on similar latices the calculated values are believed to be related to actual sizes. The calculated seed resin diameters and shell thickness values are shown to be highly meaningful as respects the development of impact strength and also for the most efficient use of the rubbery phase in the products of this invention.

SEED RESIN LATICES

This starting ingredient in the method of this invention is prepared from a monomeric material consisting of at least 80 percent/wt. of vinyl chloride, optionally not more than a total of 20 percent/wt. of one or more monovinylidene monomers (i.e., those containing a single $CH_2 = C<$ group per molecule) copolymerizable with vinyl chloride in aqueous dispersion such as vinylidene chloride, styrene, methyl acrylate, methyl methacrylate, vinyl acetate, and the like and, also optionally, from about 0.25 to about 5 percent/wt., more preferably from about 0.5 to about 3 percent/wt., of a crosslinking monomer, i.e., a monomeric material free of conjugated unsaturation and containing at least two $CH_2 = C<$ groups per molecule and capable of copolymerization with vinyl chloride in aqueous dispersion. Best results are achieved with monomeric materials consisting either entirely of vinyl chloride, i.e., with polyvinyl chloride seed resin latices, or of vinyl chloride and a crosslinking agent.

CROSSLINKING MONOMERS

Nearly any monomeric material which is free of conjugated unsaturation and contains at least two $CH_2 = C<$ groupings per molecule may be employed to crosslink and insolubilize the vinyl chloride seed resin. Divinyl benzene, divinyl naphthalene, p,p' divinylbiphenyl, p,p'-diisopropenylbiphenyl, the vinyl cyclohexanes and other polyvinyl and polyallyl-substituted hydrocarbons are relatively inexpensive and available materials known to be good crosslinking agents readily copolymerizable with vinyl chloride. Fusible, soluble, low molecular weight homopolymers of divinyl benzene and soluble 1,2-polybutadienes high in side chain vinyl groups may also be employed. Another important class of cross-linkers are monomeric esters and polyesters of an unsaturated acid and a polyhydric alcohol described below for use in the acrylate monomeric mixture.

Another preferred type of cross-linking monomers that appear to have little or no graft-inducing propensity are the polyalkenyl polyethers of polyhydric alcohols which contain from 2 to 6 of the alkenyl ether groups each in the terminal or vinylidene structure $CH_2 = C<$ such as are also described below for use in the acrylate mixture.

GRAFTING/CROSSLINKING MONOMERS

To induce grafting between the seed resin and the over-polymerized acrylate copolymer rubber, the crosslinking monomer should have the ability not only to insolubilize the vinyl chloride seed resin but also the ability to only partially react during polymerization leaving at least a few unreacted polymerizable groupings on the surface of the seed resin particles available as sites for grafting. Such monomers, in general, contain at least two dissimilar polymerizable groupings which demonstrate different reactivities toward vinyl chloride during polymerization. One class of such monomers are the vinyl and allyl esters of unsaturated carboxylic acids and unsaturated acid anhydrides and their amides illustrated by allyl methacrylate in which the allyl alcohol group

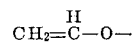

appears materially slower to polymerize with vinyl chloride than the alpha-methyl-substituted vinylidene group

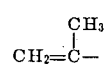

of the methacrylic acid portion of the ester. Still other monomers of this class include vinyl acrylate, vinyl methacrylate, allyl acrylate, diallyl itaconate, the mono-allyl and diallyl maleates, the mono-allyl and diallyl fumarates, diallyl diglycollate, allyl acrylamide, diallyl acrylamide, allyl methacrylamide, allyl crotonate, cinnamyl acrylate, crotyl acrylate, crotyl methacrylate, and others. Allyl methacrylate is a preferred crosslinking/grafting monomer.

Such seed resin latices are prepared by polymerizing the monomeric material containing vinyl chloride in aqueous dispersion employing water-soluble catalysts and water-soluble dispersing agents as is conventional in the art.

As indicated above, the seed resin latices should contain small latex particles of uniform average diameter between about 200 A and about 1,700 A, more preferably between about 250 A and about 1,250 A, and most preferably between about 250 A and about 800 A in average diameter. To obtain latices of this character the polymerization of the monomeric material in aqueous dispersion is commenced in the resence of a somewhat larger than normal initial proportions of emulsifier and catalyst so as to initiate a large number of particles. To guard against continued initiation of new particles during the course of the reaction, further portions of emulsifier and/or catalyst are added continuously or incrementally during the reaction period in order to maintain low dispersant coverage on the growing latex particles throughout the reaction. When polymerization is complete such low emulsifier latices may require further emulsifier for stability during removal of residual monomeric material.

The polymerization to produce seed latex is carried out at any temperature conventional in the polymerization of vinyl chloride, for example between about 20° and about 75°C, more preferably between about 40° and about 60°C. Such polymerization is continued, as sodium polyacrylate, conventional, until about 60 to 80 percent of the vinyl chloride monomer has been converted to polymer and the unreacted monomeric materials removed. Seed resin latices, because of their fine particle size should be made to only moderate solids levels somewhere in the range of from about 15 percent to about 50 percent/wt. more preferably 20 to 35 percent/wt. because of high viscosities at the higher solids levels.

FIRST STAGE OVER-POLYMERIZATION

Monomeric Mixture Polymerized

In this stage, there is employed a monomeric mixture consisting of (1) not less than about 80 percent/wt. of an alkyl acrylate in which the alkyl group contains two to eight carbon atoms, (2) up to about 19.5 percent/wt. of one or more monovinylidene monomers (i.e. those containing a single $CH=C<$ group per molecule) copolymerizable with the alkyl acrylate in aqueous dispersion, and (3) from about 0.5 to about 8 percent/wt., more preferably from about 1 to about 4 percent/wt., of a non-conjugated cross-linking monomer containing at least two $CH_2=C<$ groups per molecule.

The alkyl acrylate monomer may be ethyl acrylate, propyl acrylate, n-butyl acrylate, isobutyl acrylate, n-hexyl acrylate, and 2-ethylhexyl acrylate and others. Most preferred are acrylates in which the alkyl group contains two to four carbon atoms. Most preferred is n-butyl acrylate. Polymers of methyl acrylate are not sufficiently rubbery and polymers of the alkyl acrylates in which the alkyl group contains more than eight carbon atoms also lack rubberiness.

The monovinylidene monomers (2) which may be employed in small amounts include vinyl acetate, vinyl chloride, vinylidene chloride, acrylonitrile, methyl methacrylate, styrene, alkyl acrylates in which the alkyl group is methyl or contains more than four carbon atoms such as 2-ethylhexyl acrylate, vinyl ethyl ether, vinyl ethyl ketone, acrylamide, 1-monoolefins such as ethylene, propylene, n-butene, 2-ethyl-hexene-1, and others.

Suitable cross-linking monomers include the preferred class consisting of (a) monomeric polyesters of a polyhydric alcohol and of acrylic or methacrylic acids containing from 2 to 6 polymerizable acrylic acid groups per polyester molecule and (b) monomeric polyalkenyl polyethers of polyhydric alcohols containing from 2 to 6 polymerizable alkenyl ether groups per polyether molecule. The monomeric acrylic polyesters (a) may include diethylene glycol diacrylate (hereinafter abbreviated "DEGDA"), diethylene glycol dimethacrylate, trimethylene glycol diacrylate, butylene glycol diacrylate, pentamethylene glycol diacrylate, octylene glycol diacrylate, glyceryl diacrylate, glyceryl triacrylate, trimethylol propane triacrylate, trimethylol propane trimethacrylate, the tetraacrylate ester of pentaerythritol and others.

The polyalkenyl polyether type of cross-linking agent (b) which contains the alkenyl ether groups in the terminal vinylidene $CH_2=C<$ group may be produced by the Williamson synthesis in which a suitable alkenyl halide such as allyl bromide is reacted with an alkaline solution of polyhydric alcohols derived from sugars and related carbohydrates such as sucrose, maltose, fructose and the like. An available monomer of this class is a polyallyl ether of sucrose containing 2, 3, 4 or more allyl ether groups per molecule.

The monomeric acrylic polyesters and monomeric polyalkenyl polyether compounds polymerize smoothly with alkyl acrylate monomers and appear to enter the copolymer chain in a uniformly random manner and at a frequency apparently determined largely by their concentration in the monomeric mixture. Their use in low concentration such as are described above leads to no tightly gelled or rigid three-dimensional networks which could show up as hard lumps or discontinuities in the final blend.

PROCEDURE

In the first stage, the seed resin latex described above, the acrylate monomeric material defined above, and the usual polymerization adjuvants and their proportion selected to favor polymerization of the monomers on the dispersed seed resin particles to the substantial exclusion of new particle initiation (i.e. low emulsifier coverage, as disclosed in U.S. Pat. No. 2,520,959 referred to above which patent disclosure is incorporated by reference herein) are combined and the polymerization is effected in a closed vessel at any temperature in the range of from about 20° to about 100°C., more preferably from about 35° to about 70°C., and the reaction continued until essentially all of the monomeric material has been converted to polymer. If any polymerization fails to reach at least about 95 to 98 percent conversion, then the first stage latex product should be heated to 90° to 100°C. to destroy the catalyst and stabilize the polymer, and if necessary, its unreacted monomer content stripped off by distillation under vacuum.

Where the first stage latex product must be stored for a period of time before use in the second stage polymerization, it is best to heat the latex as described just above to 90° to 100°C. for a period of 30 – 60 minutes after completion of the reaction to destroy the residual catalyst.

An alternative procedure for use in commercial operations employing large reaction vessels where agitation efficiency may be low, it is sometimes preferred as a last step in stage 1 to coagulate the first stage latex product thereby producing a fluid suspension of fine, loose crumbs of polymeric material in water for use in the second stage polymerization. Such coagulation is effected by adding an aqueous solution of a salt-type coagulant while rapidly agitating the mixture. Best results from the standpoint of the production of finer suspension particles and the least harmful electrolytic contamination of the final product is to employ as a coagulant a dilute solution of alum(aluminum sulfate) in water.

SECOND STAGE POLYMERIZATION

Monomeric Materials Polymerized

In this stage, there is utilized a monomeric material consisting of not less than about 90 percent/wt. of vinyl chloride and not more than about 10 percent/wt. of one or more monovinylidene monomers copolymerizable in aqueous suspension with vinyl chloride. The monovinylidene comonomers may be vinylidene chloride, styrene, methyl methacrylate, acrylonitrile, 1-olefins such as ethylene, propylene, n-butene and others, and many others. It is preferred, however, to employ vinyl chloride only as a monomer since the homopolymer polyvinyl chloride is the best and most economic rigid resin in the compositions of this invention.

Procedure

The second stage over-polymerization can be, except for change in monomeric material, carried out in the same manner as the first stage over-polymerization. To do this, the first stage product containing rubber-covered latex particles is diluted with water and additional water-soluble emulsifiers and a water-soluble catalyst added thereto under conditions approximating the low emulsifier coverage technique employed in preparing the original seed resin latex. In such a procedure, polymerization in aqueous dispersion ensues with the production of a more or less stable latex which is then coagulated to form a suspension fo macro-granular polymeric product which is either worked up as such or first blended with a suspension of virgin (i.e., rubber-free) vinyl chloride resin and the resulting blended suspension filtered and the filter cake washed with water and the resin blend dried, preferably in an air or vacuum oven or in an air suspension drier operating at 200°F. or lower.

A much preferred procedure in the second stage is to employ either (1) a suspension over-polymerization wherein the first stage latex product is combined with water, a monomer-soluble peroxygen catalyst such as isopropyl peroxy percarbonate, benzoyl peroxide, and others, and a colloidally active suspension polymerization stabilizer such as polyvinyl alcohol, sodium oolyacrylate, glue, gelatin or bentonite clay and polymerization effected with the gradual disappearance of the latex phase forming directly a suspension of a macro-granular product or (2) as indicated above, convert the first stage latex product by coagulation to a suspension of fine crumbs in water, then add monomer, monomer-soluble catalyst, and colloidally-active suspension agent, and then carry out a suspension-on-suspension polymerization.

In either of the atlernative preferred procedures it is usually preferred to dissolve the monomer-soluble (vinyl chloride soluble) peroxygen catalyst in the second stage monomeric material before the latter is added to the polymerization vessel, thereby eliminating the possibility of an inhibition period while the suspended monomer absorbs a separately added catalyst. Likewise, the suspension agent preferably is dissolved or dispersed in water and the resulting solution added to the liquid in the reactor, just before monomer addition.

As in all stages of the process, the polymerization is carried out in a closed vessel with the usual precautions of purging the oxygen content of the reactor before addition of materials. As has been described above in connection with the preparation of the vinyl chloride seed resin latex, the polymerization of the vinyl chloride containing monomeric material is effected at any temperature between about 20° and about 75°C., more preferably between about 40° and about 60°C. and the polymerization is continued, as is conventional for vinyl chloride resins, until about 60 to about 80 percent of the total vinyl chloride monomer has been converted to polymer. The polymerization temperature, monomer concentration and catalyst concentration are selected to produce a resin deposit of the desired molecular weight, but see more about this below. The last step in the second stage polymerization may be the addition of a polymerization shortstop and the removal, preferably under vacuum, of residual unreacted monomeric materials.

It is usually desirable that the polymerization reaction in the second stage be terminated by addition of a polymerization short-stop or catalyst killer in order to prevent continued polymerization during subsequent handling, especially during removal of residual monomers. For this purpose, a dilute solution of "Bisphenol A" (P,p'-isopropylidene diphenol) in methanol has been found especially useful since this shortstop material is nondiscoloring and does not impart ordor to the final resin.

FINAL BLEND PREPARATION

Figure 6:
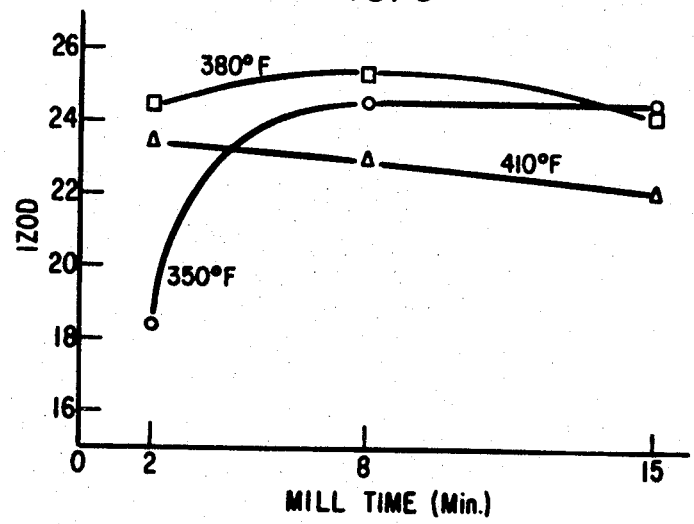
FIG. 6 is a graph presenting the effects of the temperature and time of milling on the Izod impact strength of compositions of this invention containing 6 phr of gelled butyl acrylate copolymer and prepared employing 1,010 A polyvinyl chloride seed, 180 A gelled butyl acrylate copolymer shell thickness, and containing polyvinyl chloride exhibiting a IV of 0.9, the graph showing (1) that with polyvinyl chloride of such appreciable molecular weight, approximately 4 to 5 minutes of milling at 350°F are required for impact strength whereas with minimum milling temperature of about 375° – 380°C. rapid development of high impact strength occurs in 2 minutes or less and (2) that the compositions tenaciously retain their impact strength even after long-continued mechanical working at the higher temperatures of 380° – 410°F.

As indicated above, the macro-granular product obtained in the second stage polymerization will contain from 3 to 65 percent/wt., more usually from about 10 to about 25 percent/wt. of the polyacrylate ingredient. I have found surprisingly that such second stage product can be diluted with vinyl chloride resin not containing a rubber phase to produce a final blend having an average concentration of polyacrylate from about 3 to about 6 phr. Such final granular blend needs to be fluxed, fused and masticated to homogeneity under fairly intensive shear in or on a mixer apparatus having its metal surfaces in contact with the plastic maintained at a temperature somewhat above what has been the practice with most rigid vinly chloride resins, i.e., between about 35° and 440°F., more preferably between about 375° and 420°F. Stock temperatures will usually be slightly higher than this during such mechanical working. FIG. 6 of the drawings shows the beneficial effects of higher processing temperature on development of impact strength.

The blending of the second stage polymerization product can be carried out in any convenient manner. Dry resins may be powder blended in an internal mixer and the powder blend transferred to a two roll plastics mill having its rolls maintained at the temperatures indicated for the final fluxing under shear at high temperatures.

A better procedure for a resin manufacturer is to blend the final second stage aqueous suspension of masterbatch product with a like suspension of virgin vinyl chloride resin not containing a rubber phase. The blended suspension may then be filtered, washed and dried and, finally, masticated as indicated. The latter preferred blended suspension prepared in this way has the added advantage of being easier to dry than the undiluted second stage product, per se. Also, the polymer manufacturing plant can from one charge of second stage suspension make up a number of polymer blends for various purposes containing various different dilution resins and also containing any proportion of rubber phase within the 3 – 6 phr range. Likewise, the second stage granular polymerization product can be isolated for sale per se as a masterbatch material to resin customers who will perform the final dilution blending during their regular resin formulation procedures employing powder blending equipment.

The blends of this invention require the addition of the usual vinyl chloride resin stabilizers and in the usual proprotions. I have found that organo-tin types of stabilizers such as dibutyl tin diglycollate known commerically as "Thermolite 31" (TM, Metal and Thermit Corporation) or dibutyl tin dilaurate are particularly effective in the products of this invention.

The amount of working required to develop optimum impact resistance in the final diluted blend is not susceptible of precise definition. However, an operative amount of working can be described with respect to a specific mixing apparatus and a standard mixing procedure. Such an apparatus is a two-roll differential plastics mill having oil-heated rolls four inches in diameter rotating at 15 rpm/20 rpm. The final blend composition including fillers, stabilizers, lubricants and other conventional compounding ingredients in powder mix form is placed on such rolls and mixing begun and continued until the material coalesces to form a sheet on one of the rolls. The time of mixing is measured from the latter point, there being required usually from 2 to 5 minutes at the mill roll temperatures specified during which time the stock is repeatedly cut back and forth across the rolls to insure homogeneity.

A mill-mixed stock in sheet form prepared in this way is usually preheated to a temperature about 10°F. above its milling temperature and molded for 3 minutes in an ASTM standard tensile sheet mold maintained at the preheat temperature under 30,000 lbs. pressure. The resulting press molded sheet is cooled in the mold and the ASTM Izod impact strength (ASTM No. D256–56, Method A) determined on specimens prepared from the molded sheet. In some cases, the ASTM Heat Distortion Temperature ("HDT") is also determined on the press molded tensile sheets employing ASTM Procedure No. 648–56 at 264 psi.

The nature of the final blend may be varied to some extent by varying the molecular weight of the overpolymerized vinyl chloride matrix resin or that of the resin added as diluent resin. For example, polyvinyl chloride resins having inherent viscosities (ASTM D1243 employing 0.2 gram of resin in 100 ml. of cyclohexanone at 30°C) of about 0.90 up to about 1.15 form blends which are exceptionally hard, very rigid and useful in structural applications where maximum resistance to deformation by heat is required. Polyvinyl chlorides of this same range of molecular weight also produce final blends having flow properties enabling their use in extrusion and plastics roll-forming and vacuum forming operations such as in plastic sheet and tubing, plastic pipe, and house siding. Polyvinyl chlorides having inherent viscosities between about 0.5 and about 0.80 form compositions having somewhat higher flow rates which are useful in injection molding.

Since the vinyl chloride resin seed employed in stage 1 usually consitutes not more than a few percent of the final blend, the nature of the seed resin per se as respects its molecular weight is very much less critical than is that of the over-polymerized matrix resin or that of the diluent resins employed. It is generally preferred, therefore, for the seed resin to be of a medium to high molecular weight corresponding to that of a polyvinyl chloride of inherent viscosity between about 0.60 to about 1.15.

OTHER INGREDIENTS

If desired, still other compounding ingredients may be added either to the stage 2 granular product or to the final diluted blend composition. In addition to resin stabilizers there may be added small proportions of colorants, fillers, pigments, opacifiers, lubricants, processing aids, and still other conventional rigid resin compounding ingredients either during mastication or drymixed with the dry granular products before its use in the production of a useful shaped article. Resinous processing aids may be employed but are not required for good processability in commerical equipment, see Examples 6 et seq below.

The following specific examples are intended as being illustrative only and not as limiting the invention in any way.

EXAMPLE I

In this example, the nature of the tough, rubbery, essentially completely gelled polyacrylate will be demonstrated by tests performed on several samples of gelled polyacrylates made by the procedures of this invention but without vinyl chloride resin in order to produce a pure, gelled polyacrylate suitable for examination.

A monomeric mixture of n-butyl acrylate containing about 3 percent/wt. based on the total mixture of diethylene glycol diacrylate ("DEGDA") as a crosslinking monomer is polymerized in aqueous dispersion utilzing a reaction medium having the following composition:

| Material | Parts/Vol. or Parts/Wt. |
|---|---|
| Water | 2100 ml |
| $K_2S_2O_8$ | 1 gram |
| $K_2S_2O_5$(5% Aq.Sol.) | 10 ml |
| $Na_2S_2O_4$(1% Aq.Sol.) | 2 ml |
| n-butyl acrylate | 1250 grams |
| "DEGDA" | 38.5 grams |
| Emulsifier Solution * | 55 ml |

*"Siponate DS10" (10%/wt. Aq.Sol.), an emulsifier made by Alcolac Chemical Corporation and said to be a purified form of dodecyl benzene sodium sulfonate.

The above medium is prepared by first combining the water and $K_2S_2O_8$ in closed, stirrer-equipped reaction vessel from which oxygen had been purged or displaced by pure nitrogen. The stirrer is started and heat applied to heat the liquid to about 40°C. at which point the $K_2S_2O_5$ solution is injected. The n-butyl acrylate and DEGDA are premixed and addition of the mixture to the reaction vessel begun in a portionwise manner, the rate of such addition being controlled at a rate of hold the temperature of the liquid in the range of 38° – 40°C. After the addition of some 60 ml. of monomers over the first 40-minute period, a 1 ml. portion of the $Na_2S_2O_4$ solution and a 1 ml. portion of the emulsifier solution are added. Polymerization is continued with periodic additions of the same liquids in this matter over a 7½ hour reaction period wherein about 1 ml. of emulsifier solution is added for every 20 ml. of monomeric mixture.

After all materials have been added, stirring is continued for an additional one-half hour while applying heat to hold the liquid contents at 38° – 40°C. The reaction mixture is then allowed to cool and the reaction vessel opened to reveal a fluid latex. Such latex is stripped of its unreacted monomers by vacuum distillation. There is obtained a final yield of 3,223 grams of a stable latex containing 36.1 percent/wt. of total solids.

A portion of the latex is coagulated by mixing with about 3 volumes of methanol and the resulting rubbery crumbs dried in a vacuum oven at 50°C. The dry crumbs are so tough and elastic that they resemble a vulcanized rubber. A portion of the crumbs is disintegrated into small pieces and added to a sealed container containing toluene. The container and its contents are rolled on paint mixing rolls overnight at room temperature. The liquid contents are ultra-centrifuged at 30,000 r.p.m. to obtain a solid-free liquid. The total solids content of an aliquot portion the solid-free liquid is determined by evaporating to dryness and the total solubility of the original dry crumbs calculated. The solubility of the gelled butyl acrylate copolymer of this example determined in this manner is very low, being of the order of only about 1.3 percent/wt.

A mixture of ethyl acrylate and about 3 percent/wt. of DEGDA is polymerized employing a similar procedure and materials. The coagulated dry crumbs obtained from the resulting latex are likewise rubbery, tough and elastic. They are found by the abovedescribed centrifuge solubility procedure to have a solubility in toluene at room temperature of only about 2 percent/wt.

EXAMPLE 2

In this example, a cross-linked, essentially completely gelled copolymer of n-butyl acrylate and diethylene glycol diacrylate similar to that of Example 1 is incorporated into polyvinyl chloride by the two-step over-polymerization method of this invention.

PREPARATION OF SEED LATEX

A small particle size polyvinyl chloride latex is prepared by polymerizing liquid monomeric vinyl chloride in aqueous dispersion employing the following recipe:

| Material | Parts/Vol. Parts/Wt. |
|---|---|
| Water | 750 ml. |
| Emulsifier (10%/wt.Aq. Sol.)* | 40 ml. |
| Vinyl Chloride | 400 grams |
| $Na_2S_2O_4$ (1%/wt.Aq.Sol.) | 1 ml |
| $K_2S_2O_8$ (5%/wt.Aq.Sol.) | 20 ml |
| *Same as Example 1 | |

A stirrer-equipped metal reactor is sealed, purged with nitrogen, and the water and all of the emulsifier solution added. The reactor is then evacuated and the vacuum broken by introducing the liquid vinyl chloride. Heat is applied with stirring and when the reactor contents reach 52°C. the $Na_2S_2O_4$ solution is injected. About 5 minutes later that $K_2S_2O_8$ solution is injected. Reaction commences as indicated by the necessity to apply cooling to the reactor. In about 2½ hours the pressure in the reactor begins to drop indicating exhaustion of the liquid vinyl chloride content of the mixture. When such pressure has dropped about 5 psi (after 2 hours 47 minutes) rapid cooling is applied to stop the reaction. The reactor is then opened and the residual unreacted vinyl chloride vented off. The latex is passed through a cheesecloth filter but only negligible solids collect on the filter. A yield of about 1,100 grams of finished latex is obtained to which an additional 55 ml. of the same emulsifier solution is added to stabilize the same. The latex is then found to contain 29.3 percent/wt. of polyvinyl chloride, 0.8 percent emulsifier and 0.08 percent/wt. of salts.

A sample of the stabilized latex is subjected to a standard soap titration determination and the average latex particle size determined by calculation. Average latex particle size thus calculated is 260 A.

FIRST -STAGE OVER-POLYMERIZATION

The seed latex described is subjected to an over-polymerization in aqueous dispersion wherein a tough, rubbery essentially completely-gelled copolymer of n-butyl acrylate and 3 percent/wt. of DEGDA similar to that of Example 1 is deposited on the 260 A seed latex particles. The materials utilized are:

| Materials | Parts/Vol. or Parts/Wt. |
|---|---|
| Water | 400 ml. |
| $K_2S_2O_8$ | 150 mg. |
| $K_2S_2O_5$ | 75 mg. |
| Seed Latex (above) | 41.3 g* |
| * contains 12.1 g. polymer | |
| Emulsifier * | 0.5 g. |
| n-butyl acrylate) pre-mixed | 138 g. |
| DEGDA ) pre-mixed | 4.1 g. |
| * Same as Example 1, added as 10%/wt. Aq. Sol. | |

A 1-liter glass reactor equipped with a stirrer is sealed and a nitrogen purge applied. The water, $K_2S_2O_8$, $K_2S_2O_5$ and all of the emulsifier solution are added and stirring commenced to dissolve the solid catalyst ingredients. The seed latex is then added and heat is applied. When the liquid reaches 40°C., addition of the pre-mixed liquid monomeric materials begun at a rate of about 0.9 ml./min. Monomer addition continues in this fashion for 2 hours and 5 minutes while stirring and maintaining the temperature of the reaction mixture at 40°C. Agitation of the mixture is continued for an additional 20 minutes at 40°C after all monomer has been added. Heat again is applied until the reaction mixture reaches 80°C. The mixture is then cooled, the reactor opened and the latex product filtered through cheesecloth. From about 530 grams of finished latex there is collected only 7.1 grams of coagulum. Such latex is found to contain 27.2 percent/wt. of total solids of which 24.8 percent/wt. is gelled butyl acrylate copolymer, 2.18 percent/wt. is the original polyvinyl chloride latex seed, 0.16 percent is emulsifier and 0.05 percent/wt. are salts. Stated on a dry solids basis, this first stage product constitutes about 92 percent/wt. of polyacrylate and about 8 percent/wt. of polyvinyl chloride. The butyl acrylate/DEGDA mixture polymerized to a conversion of at least about 98 percent. The gelled copolymer coating on the 260 A latex seed particles is 200 A in thickness, as determined by calculation from soap titration data.

SECOND-STAGE SUSPENSION OVER-POLYMERIZATION

The first stage latex is subjected to an over-polymerization in aqueous suspension employing the following recipe:

| Materials | Parts/Vol. Parts/Wt. |
|---|---|
| Water | 1 liter |
| "Methocel HG 65"* | 50 ml. |
| $K_2HPO_4 \cdot 3H_2O$ | 50 mg. |
| First-stage latex | 137 g. |
| Vinyl Chloride | 400 g. |
| Catalyst Solution** | 2.5 ml. |
| * TM, Dow Chemical Corp. methyl cellulose, added as 1%/wt. aqueous solution(suspension agent) | |
| ** Isopropyl peroxy percarbonate, added as a 10%/wt. solution in methanol. | |

A metal reaction vessel about 2.7 liter capacity and equipped with a stirrer is purged with nitrogen, sealed and the water, potassium hydrogen phosphate, the methyl cellulose suspension agent and latex are then added and the agitator started at 400 rpm. The reactor is then evacuated and the vacuum broken by charging the entire amount of liquid vinyl chloride. The reaction vessel and its liquid contents are heated to 60°C. and the contents stirred for about one-half hour at which point the catalyst solution is injected. The reaction mixture is stirred and maintained at 60°C. by application of cooling water over a period of about 1 hour and 24 minutes at which point the pressure in the vessel is observed to have fallen about 5 psi. At the latter point, the reaction vessel and its contents are cooled rapidly and the vessel opened and the residual vinyl chloride monomer vented off. There remains in the vessel a recipe of uniform macrogranular polymer particles averaging in the range of about 75 to 150 microns in diameter. recipe The suspension is filtered, the filter cake washed twice with water and once with hot methanol, and the granular product dried to constant weight in a vacuum oven at 50°C. A yield of 283 grams of dried product is obtained containing about 11.6 percent/wt. of the gelled butyl acrylate copolymer and about 88.4 percent/wt. of polyvinyl chloride (weight of seed plus weight of over-polymerized second stage resin).

The dried products are powder blended with an added polyvinyl chloride diluent resin and compounding materials as follows:

| Recipe | Samples, parts/wt. | | | | | |
|---|---|---|---|---|---|---|
| | A | B | C | D | E | F |
| Above product | 63.8 | 49.1 | 41.4 | 32.8 | 25.0 | |
| "Geon 105 EP"[1] | 36.2 | 50.9 | 58.6 | 67.2 | 75.0 | 100 |
| Processing aid[2] | 2 | 2 | 2 | 2 | 2 | 2 |
| Lubricant | 2 | 2 | 2 | 2 | 2 | 2 |
| "Thermolite 31"[3] | 3 | 3 | 3 | 3 | 3 | 3 |
| Rubbery acrylate | 8 | 6 | 5 | 4 | 3 | None |
| Flow rate, 400 lbs.[4] | 3.48 | 3.07 | 3.81 | 3.92 | 4.3 | 5.2 |
| Swell flow rate, 800 lbs.[4] | 59.8 | 44.4 | 44.9 | 44.0 | 44.4 | 48.4 |
| ASTM Izod, ft. lbs./in | 20.7 | 21.2 | 16.0 | 1.59 | 1.14 | 0.48 |
| Stress strain: | | | | | | |
| 1st YP, p.s.i | 5,715 | 6,207 | 6,385 | 6,696 | 6,834 | 7,796 |
| 2nd YP, p.s.i | 4,265 | 4,517 | 4,569 | 4,737 | 4,708 | 5,377 |
| Tensile, p.s.i | 6,343 | 6,575 | 6,509 | 6,626 | 6,368 | 6,096 |
| Percent elongation | 175 | 171 | 180 | 173 | 173 | 176 |

[1] TM, B.F. Goodrich Chemical Company, commercially available polyvinyl chloride, easy processing variety; IV of about 0.74.
[2] A styrene/acrylonitrile copolymer resin or "SAN."
[3] TM, Metal & Thermit Corp., dibutyl tin diglycollate.
[4] Proprietary constant load rheometer data obtained at 400 lbs. or 800 lbs. load, orifice 0.045 inch I.D. and orifice L/D of 7; expressed in grams of extrudate in 10 minutes.

The above compositions are prepared by mill mixing at 380°F., 390°F. preheat and 3 minute press molding according to the procedures described in the text above. Note that the second stage product is diluted in these experiments with from about 50 to about 300 percent/wt. of added polyvinyl chloride resin.

The data taken on the press molded tensile sheets show quite good properties at the 5 and 6 phr loadings in spite of the fact that the polyvinyl chloride in these products is of lower molecular weight than employed in some of the other examples herein.

Figure 4:
FIG. 4, is photomicrograph similar to that of FIG. 3 but taken on a similar product made without seed latex by a single over-polymerization of polyvinyl chloride on particles of a gelled n-butyl acrylate/3 percent DEGDA latex, this photomicrograph showing the completely dispersed particulate nature of the dispersion of the lighter-colored acrylate rubber in the darker polyvinyl chloride matrix.
Figure 5:
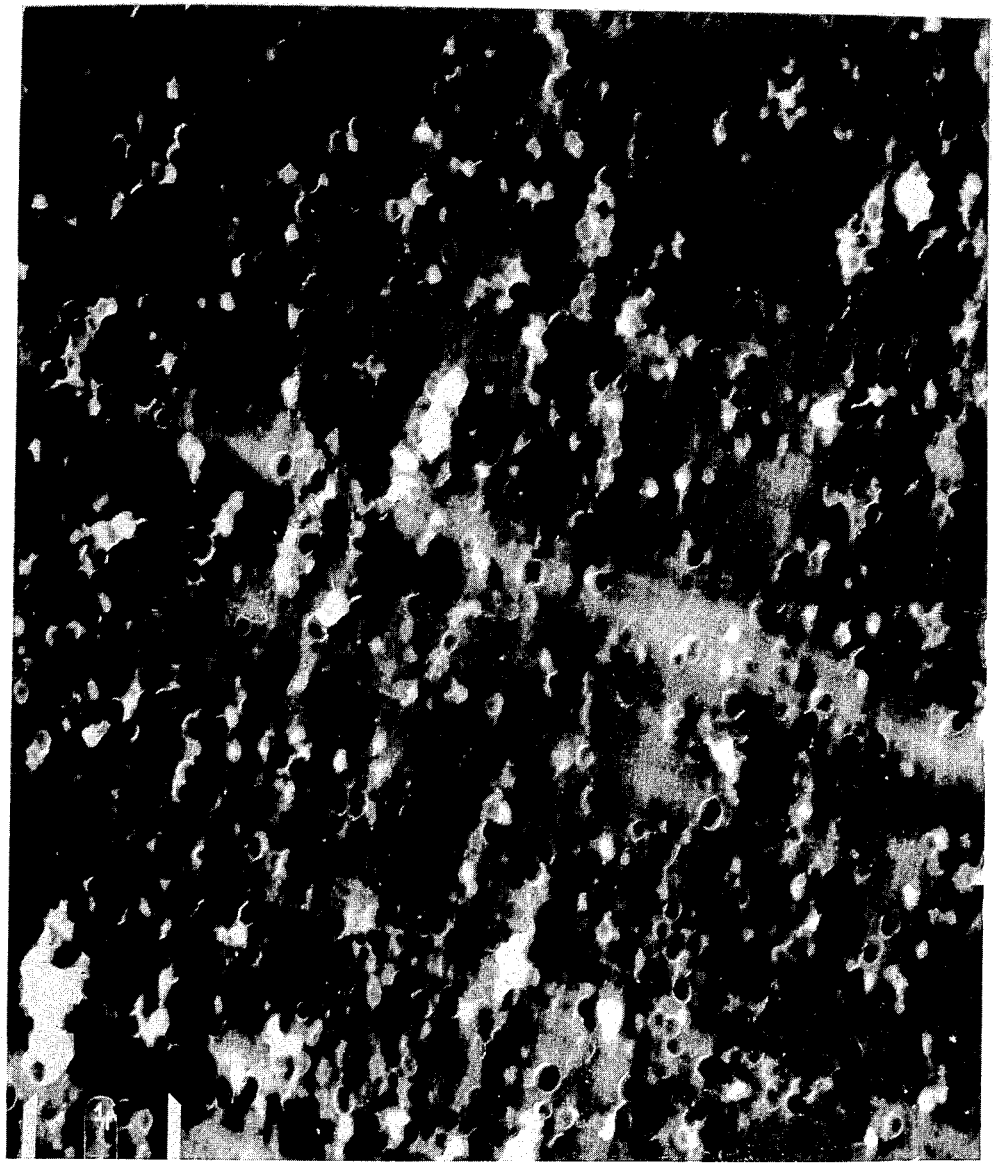
FIG. 5 is another photomicrograph similar to that of FIG. 3 but taken on a product of this invention after compounding and milling according to the procedures of the specific examples, this photomicrograph showing the existence after milling, of at least a portion of the rubbery acrylate in its original network-style of dispersion and another portion converted into ball-like spheres or globules of rubbery material in a dark matrix of polyvinyl chloride resin.

As indicated above, these data are obtained with a polyvinyl chloride somewhat too low in molecular weight for best impact properties. Another series of blends are prepared employing the second stage polymeric product of Example 2 and the same blend recipes but substituting a polyvinyl chloride diluent resin ("Geon 103 EP") having an IV of about 0.94. For purposes of comparision a control composition such as is portrayed in FIG. 4 of the drawings is prepared by overpolymerizing vinyl chloride in aqueous suspension at 50°C. on a similar 97 butyl acrylate/3 DEGDA gelled copolymer latex (average latex particle size about 2,000 A but prepared without a vinyl chloride resin seed latex). The latter over-polymerized product contains 54 percent/wt. of gelled butyl acrylate copolymer and 46 percent/wt. of polyvinyl chloride. All of the experimental and control composition are tested for Izod impact values as follows:

| Phr of Gelled Copolymer | Experimental | Izod IMPACT ft. lbs/in. *Control(no seed) |
|---|---|---|
| 3 | 1.8 | Ca 2 |
| 5 | 19.4 | Ca 11 |
| 8 | 24.3 | Ca 22 |
| 10 | — | Ca 23 |

* Read off curve in FIG. 11 of copending application, Ser. No. 673,055, filed oOct. 5, 1967.

The above data indicate an advantage in rubber efficiency in the experimental compound resulting from the use of a seed latex. The above data indicate that about 5 phr of the seeded rubber phase is about as efficient in imparting impact strength as is 8 to 10 phr of unseeded gelled butyl acrylate copolymer.

EXAMPLE 3

In this example, a seed latex containing polyvinyl chloride latex particles averaging 377 A in diameter is prepared by a procedure similar to that demonstrated in Example 2 except for substitution of sodium laurate for the sodium benzene sulfonate type of emulsifier. It is believed that this soap-type emulsifier produces a more stable form of polyvinyl chloride. The seed latex contains 25.4 percent total solids of which 24.8 percent/wt. is polyvinyl chloride, 0.29 percent/wt. is soap and 0.31 percent/wt. constitutes salts.

FIRST-STAGE OVERPOLYMERIZATION

The procedure and materials for this stage is similar to that of Stage 1 in Example 2 except that sodium laurate emulsifier is employed and a smaller proportion of monomer is employed. There results a stable latex containing 27.8 percent/wt. total solids of which 23.56 percent/wt. is gelled polyacrylate rubber, 3.97 percent/wt. is polyvinyl chloride representing the original seed resin particles, 0.07 percent wt. is sodium laurate and 0.08 percent/wt. is made up of residual salts. The shell thickness in this case is 200 A on the 377 A seed. On a dry solids basis, this first stage product contains about 85 percent/wt. of gelled butyl acrylate copolymer and about 14.5 percent/wt. of polyvinyl chloride seed resin solids.

SECOND-STAGE OVERPOLYMERIZATION

This stage employs a very similar recipte except for substitution of $Na_3PO_4$ for the potassium phosphate buffer employed in Example 2. There is obtained a slurry of macro-granular polymeric material averaging about 100 microns in diameter which yields 275 grams of dry solid product. With the materials, polymerization temperature (52°C.) and recipte utilized in this polymerization polyvinyl chloride resin of IV about 0.9 usually is produced.

Such product is blended with a rubber-free virgin polyvinyl chloride ("Geon 103 EP," B.F.Goodrich Chemical Company, IV about 0.94) producing final blends of 3, 4, 6, and 8 phr of polyacrylate. The Izod impact values are as follows:

| Polyacrylate-PHR | Izod Values |
|---|---|
| 3 | 3.20 |
| 4 | 19.0 |
| 6 | 17.6 |
| 8 | 18.9 |

These data indicate a still further increase in the efficiency of the polyacrylate network over that shown in Example 2 since maximized Izod values appeared to have occurred in the region of 4 phr, the latter being a level one-half to one-third that usually required in previous experience with polyacrylic and other types of rubbery modifiers.

EXAMPLE 4

In this example, a series of experiments are carried out in which a polyvinyl chloride seed latex containing latex particles averaging about 400 A is given butyl acrylate DEGDA copolymer shells varying from a minimum of about 50 to about 75 A to a maximum of about 600 A in thickness. Polyvinyl chloride (IV of 0.90) is over-polymerized on the rubber-coated latex particles and the resulting products of this invention are diluted with the same "Geon 103 EP" diluent resin as employed in Example 3 to produce blends containing up to 6 and 8 phr of the polyacrylate phase. All such blends are mill-mixed and tested for Izod impact values by procedures described elsewhere herein. The results are plotted in FIG. 1 of the drawings.

FIG. 1 shows the effects of varying shell thickness values on Izod impact values at various polyacrylate loadings, each curve representing the Izod values vs. shell thickness effects at a single specified polyacrylate content. Thus at 8 phr of total polyacrylate the shell thickness values are not particularly critical while at the 6 phr level the effects of shell thickness begin to appear. However, at 5 phr the best Izod values are not achieved at shell thicknesses above about 500 A nor below about 100 A. At the 4 phr loading, it appears that shell thicknesses of above about 125 A and not more than 350 A are required. These data, it must be remembered are obtained at a single seed latex particle size (400 A).

Figure 2:
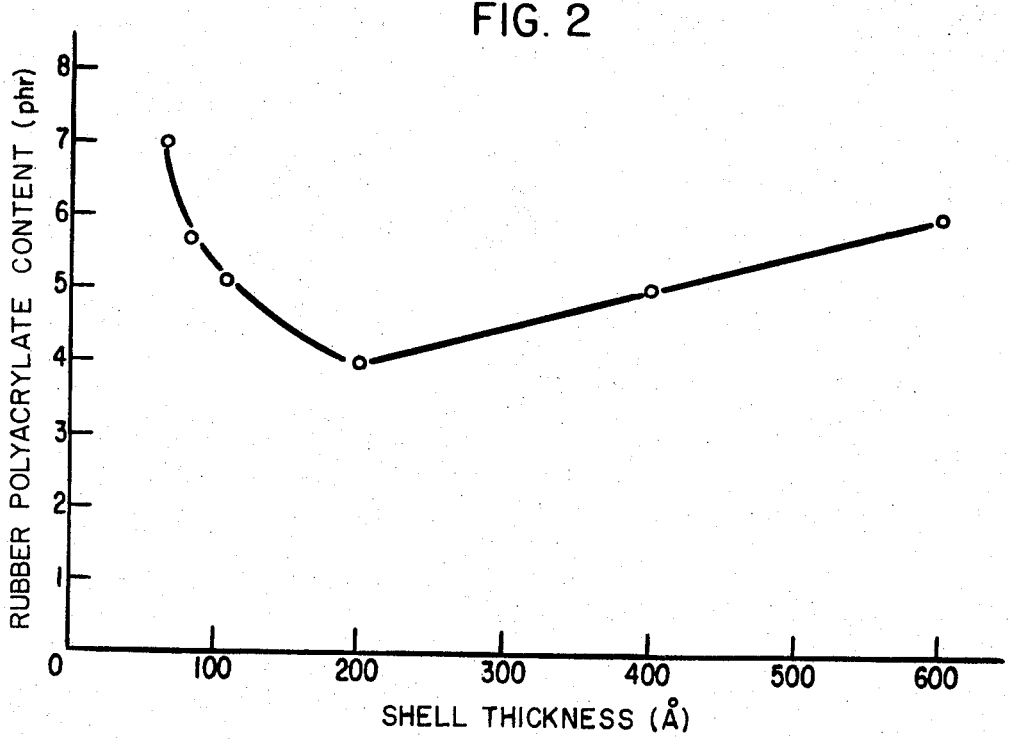
FIG. 2 is another graph produced by replotting the data from the experiments represented in FIG. 1, in this graph there being plotted as ordinates the rubber polyacrylate content in the final blends required to produce an Izod impact value of 10 to 20 ft.lbs/in. of notch and, as abscissae, the shell thickness values in A, this graph showing a pronounced minima at about 200 A shell thickness and a range of from about 125 to about 350 to 400 A where 10 to 20 ft.lbs/in. of notch Izod values are achieved at a rubber content of 5 parts or less.

The data of the experiments represented in FIG. 1. of the drawings is replotted in FIG. 2 of the drawings better to show the relative efficiency of various shell thicknesses on 400 A seed. Note that with no seed (at left hand vertical margin) the amount of polyacrylate required for high impact would be quite high (above 7 phr, usually 8 – 12 phr). With 400 A seed resin particles, however, at 50 to about 100 A shell thicknesses, the proportion of gelled polyacrylate required drops dramatically to 6 phr or less. With shell thicknesses above about 100 A up to about 400 A, the proportion of polyacrylate drops to a minimum of less than about 4 phr occurring at a shell thickness of about 200 A. The curve indicates with 400 A seed there is an efficiency advantage at shell thicknesses up to about 700 A.

EXAMPLE 5

The procedures of Example 2 are repeated starting with a polyvinyl chloride seed resin latex in which the latex particles are 760 A in average diameter. The first stage overpolymerization proceeds to 95 percent or more conversion depositing a shell 420 A thick on the seed latex particles producing a product latex containing about 27 percent wt. total solids of which about 23.1 percent is the rubbery gelled butyl acrylate/-DEGDA copolymer and 3.8 percent wt. is the polyvinyl chloride seed resin.

Several experiments are conducted in each of which a second stage over-polymerization in suspension with vinyl chloride is carried out, two such experiments being carried out at 50°C. and two at 60°C. to produce directly final over-polymerized products containing, respectively 6.4, 4.9, 6.3 and 5.6 phr of the polyacrylate (i.e., Ca 94 – 96 percent/wt. of total polyvinyl chloride).

On evaluation according to the procedures and compounding recipes of the foregoing examples, these products are found to have the following properties:

| Material | Polymer temp., °C. | Composition/phr. | | | |
|---|---|---|---|---|---|
| | | A | B | C | D |
| Product A 6.4 phr | 50 | 100 | | | |
| Product B 4.9 phr | 50 | | 100 | | |
| Product C 6.3 phr | 60 | | | 100 | |
| Product D 5.6 phr | 60 | | | | 100 |
| SAN* | | 2 | 2 | 2 | 2 |
| "Hiwax 125"* | | 2 | 2 | 2 | 2 |
| "Thermolite 31"* | | 3 | 3 | 3 | 3 |
| Izod impact ft. lbs./in. at 264 p.s.i. | | 12.6 | 12.7 | 17.3 | 15.7 |
| Stress-strain: | | | | | |
| 1st YP, p.s.i. | | 5,407 | 5,815 | 5,473 | 5,724 |
| 2nd YP, p.s.i. | | 4,471 | 4,609 | 5,299 | 4,482 |
| Tensile, p.s.i. | | 6,716 | 6,856 | 5,729 | 6,154 |
| Percent elongation | | 262 | 271 | 225 | 246 |

*Same as previous examples.

The above data illustrate that excellent high impact formulations having excellent physical properties can be prepared directly by carrying the second-stage over-polymerization to the final desired vinyl chloride resin content. Photomicrographs of the above masticated compositions as obtained from the reactor are not distinguishable from those obtained in the preceding examples prepared employing diluent resins. After processing and compounding, all the photomicrographs indicate that a portion at least of the rubber phase has been retained in its original network style of dispersion.

EXAMPLE 6

In this example, a composition is prepared according to the method of this invention by procedures similar to the foregoing examples, starting with polyvinyl chloride seed resin latex containing particles averaging 417 A in diameter which are given gelled butyl acrylate copolymer "shell" averaging about 180 A, and winding up with stage 2 product exhibiting a gelled butyl acrylate copolymer content of about 9.8 percent/wt. based on the total polymer content. Such product is diluted with polyvinyl chloride (IV 0.94) to produce final blends containing about 3, 4, 5, and 6 phr of the gelled butyl acrylate copolymer and compounded in a similar fashion as the foregoing examples except that no SAN resinous processing aid is employed and a small proportion of titanium dioxide pigment is incorporated to produce a pure white colored, opaque composition suitable for house siding, shutters, etc. The finished blends are converted to molded tensile sheets as described above and the Izod impact values determined thereon. The data are:

| PHR | 3 | 4 | 5 | 6 |
|---|---|---|---|---|
| Izod* | 3.1 | 12.8 | 20.1 | 22.7 |

* Average of 4 samples, expressed as ft.lbs/in. The above formulations show that no resinous processing aid is necessary to produce compositions of good processability and excellent impact strength at low polyacrylate loadings.

EXAMPLE 7

The procedure of Example 6 is repeated except that the formulations contain no pigment and minor adjustment in lubrication and processing aid is made in the control composition which is based on the same "Geon 103 EP" employed as a diluent resin in the experimental composition but employing as a replacement for the gelled polyacrylate a commerically utilized rubbery chlorinated polyethylene modifier which is milled into the polyvinyl chloride at the 8 phr level. The resulting compositions are extruded as sheets 42 to 44 mils in thickness which are in turn vacuum formed into house shutters which are subjected to air cannon impact testing ("ACIT") at 32°, 50° and 72°F. The comparable results, expressed as ft.lbs/in. are as follows:

| ACIT | Control | Experimental |
|---|---|---|
| Rubber Content-phr | 8 | 5 |
| 72°F | 4.84 | 48+, No break |
| 50°F | 2.54 | 4.74 |
| 32°F | 2.07 | 2.83 |

Note that the experimental composition based on seeded, gelled butyl acrylate toughener prepared according to this invention from a polyvinyl chloride seed latex of 1,050 A and a shell thickness of 294 A (gelled butyl acrylate content 9.7 percent/wt.) exhibits definite evidence of ductile break. Air cannon impact test results such as these are not observed with any prior known rigid polyvinyl chloride composition.

Formulations similar to those of Examples 5 through 7 containing 5 phr of gelled butyl acrylate/DEGDA copolymer retain their impact strength on extended outdoor aging. One such composition retained 95% of its impact strength after 1-year outdoor exposure in Arizona and 100 percent of its impact strength after 1-year outdoor exposure in Florida, all as determined by "VHIT" or high speed impact testing (250 cm/sec.).

EXAMPLE 8

A composition of this invention containing polyvinyl chloride of IV 0.9 is evaluated at various rubber levels to determine the effect of seeded polyacrylate rubber on the ASTM HDT values. The data are as follows:

| PHR | HDT °C. |
|---|---|
| 8 | 65.0 |
| 6 | 66.0 |
| 5 | 66.5 |
| 4 | 66.5 |
| 0 | 66.0 |

Still another composition of this invention containing a lower molecular weight polyvinyl chloride (IV of 0.57) is similarly evaluated:

| PHR | HDT °C |
|---|---|
| 8 | 63.0 |
| 6 | 64.0 |
| 0 | 61.5 |

EXAMPLE 9

This example will demonstrate the preparation of an impact modifier wherein the gelled butyl acrylate rubber is grafted to crosslinked seed latex particles prepared from a mixture of vinyl chloride and 2 percent/wt. of allyl methacrylate. The latter monomer contains one allyl group in the allyl alcohol portion of the ester and one methacrylate group in the methacrylic acid portion of the ester. These dissimilar groups are well-known to differ substantially in their copolymerization tendency toward vinyl chloride, the allyl group being markedly less active than the readily reactive methacrylyl group. The resulting crosslinked vinyl chloride copolymer latex seed resin particles are believed to have unreacted polymerizable groups, perhaps mainly allyl groups, on their surface which interreact with the acrylate monomer mixture as it polymerizes producing graft linkages between the seed and rubber phases. The presence of such graft linkages may be advantageous in reducing the separation of the rubber phase from the resin phases (i.e., the formation of rubbery spheres) during mastication under shear and thereby permit a further reduction in the proportion of rubber required for high impact strength.

PREPARATION OF SEED RESIN LATEX

Recipe

| Material | Parts/wt. or Parts/Vol. |
|---|---|
| Water | 1 liter |
| Sodium lauryl sulfate | 2.5 g. |
| Vinyl Chloride | 400 g. |
| Allyl methacrylate * | 5.6 g. (6.25 ml.) |
| $K_2S_{O_8}$ (as 5%/wt.Aq.Sol.) | 1.0 g. |

* Approx. 2%/wt. on total monomers

The procedure employed is similar to that described in the above examples except that the allyl methacrylate is added in increments of 0.25 – 0.3 ml. every 5 minutes commencing when the conversion of the vinyl chloride has reached about 12.5 percent and ending when about 52.9 percent/wt. of the vinyl chloride has polymerized. The polymerization catalyst is added in three portions during the reaction. The time at 50°C for the polymerization to reach a conversion of about 87.6 percent is about 230 minutes. The product is a latex exhibiting no odor of allyl methacrylate. After venting to remove residual vinyl chloride and filtration to remove any floc, the yield of latex is 1,364 grams and it is found to contain 25.46 percent/wt. of copolymer solids. Electron photomicrographs are prepared to determine the average diameter of the latex particles.

These data are:
Surface Area, ave. diam. — 677A
Number ave. diam. (measured) — 628.4A
Weight ave. diam. (measured) — 697.8A Another seed resin latex is prepared by a similar procedure with the same materials except that the amount of allyl mechacrylate is reduced to 1.4 grams or about 0.5 percent/wt. of the total monomers. The reaction is terminated at about 81 percent conversion and the latex vented to remove residual vinyl chloride. The particle size by electron microscope are:
By Surface Area, Av. Diam. — 468A
Number average, diam. — 440A
Weight average, diam. — 481A

FIRST-STAGE OVERPOLYMERIZATION

Both of these seed resin latices are given an over-polymerization at a temperature in the range of 40°–48°C. in aqueous dispersion in which a mixture of 270 grams of n-butyl acrylate and 8.1 grams of DEGDA is polymerized to essentially complete conversion on about 32 grams of total seed resin. These data are summarized:

| Experiment No. | Seed Resin | Seed Diameter | %/wt. Rubber | Shell Thickness A |
|---|---|---|---|---|
| A | 2%/wt. AMA* | 677 A** | 89.5 | 300 A |
| B | 0.5%/wt. AMA | 468 A** | 89.7 | 300 A |

\* AMA is allyl methacrylate
\*\* By surface area

SECOND-STAGE OVERPOLYMERIZATION

The above first-stage latices are given an over-polymerization in aqueous suspension at 50°C. with vinyl chloride.

The second stage products are as follows:

| Experiment No. | %/wt. Rubber | %/wt. Polyvinyl Chloride |
|---|---|---|
| A | 19.2 | 80.8 (Seed & Matrix resins) |
| B | 22 | 88 (Seed & Matrix resins) |

The dry products are blended in various proportions with "Geon 103" (rubber free) and compounded according to the recipe employed in the foregoing examples. ASTM Izod values, determined on ASTM press molded bars, are as follows:

| Rubber Cntent of Blend | Modifier | Izod ft.lbs/in. |
|---|---|---|
| 3 | Expt. A | 2.0 |
| 4 | do. | 9.8 |
| 5 | do. | 18.2 |
| 3 | Expt. B | 1.8 |
| 4 | do. | 18.4 |
| 5 | do. | 19.7 |

I claim:
1. In a method of dispersing a tough, rubbery, gelled alkyl acrylate polymer in a hard, rigid vinyl chloride resin, the improvement which comprises the consecutive steps of
  1. combining an aqueous seed resin latex containing
     i. vinyl chloride latex seed resin particles from about 200 A to about 1250 A in average diameter as determined by means of a soap titration procedure, said seed resin latex having been prepared by polymerizing in an aqueous dispersion containing
     (ii) one or more water-soluble dispersants a monomeric material consisting of liquid monomeric vinyl chloride, optionally not more than about 20 percent/wt. of said total monomeric material of one or more monovinylidene monomers copolymerizable in aqueous dispersion with vinyl chloride, and optionally, from about 0.25 percent to about 5 percent/wt. of a crosslinking monomer free of conjugated unsaturation and containing at least two $CH_2 = C<$ groups per molecule which demonstrate different reactivities in polymerization with vinyl chloride, with
     a. a monomeric mixture free of conjugated unsaturation and consisting of (i) at least 80 percent/wt. of an alkyl acrylate in which the alkyl groups contain from two to eight carbon atoms, (ii) not more than a total of 19.5 percent/wt. of one or more monovinylidene monomers copolymerizable in aqueous dispersion with said alkyl acrylate, and (iii) from about 0.5 percent to about 8 percent/wt. of a crosslinking monomer containing at least two $CH_2= C<$ groups per molecule,
     b. selected polymerization adjuvants, if necessary, including a water-soluble peroxygen catalyst and one or more of said water-soluble polymerization dispersants both in proportions to effect polymerization of said monomeric mixture (a) in aqueous dispersion on said seed resin particles without significant new polymer particle initiation, and
     c. water, if required, the resulting aqueous dispersion medium containing no significant proportions of chain-terminating polymerization modifiers, and effecting polymerization of said monomeric mixture (a) in said medium to form a latex product in which the original seed resin latex particles are coated with a shell of the resulting rubbery gelled acrylate copolymer ranging from about 50 A to about 500 A in thickness as determined by calculation based on a soap titration procedure, the said rubbery acrylate copolymer of said shell being soluble in toluene at room temperature to the extent of less than about 20 percent/wt. as determined by an ultra-centrifuge procedure, and the material of said shell constituting from about 12 to about 99.7 percent/wt. of the total weight of said coated particles,
  2. combining said step (1) rubber-coated latex particles with
     a. a monomeric material consisting of liquid monomeric vinyl chloride and not more than a total of 10 percent/wt. of one or more monovinylidene monomers copolymerizable with vinyl chloride in aqueous suspension, and, if necessary,
     b. a peroxygen polymerization catalyst,
     c. a polymerization suspension or dispersing agent, and
     d. water, and
  3. effecting polymerization of said step (2) (a) monomeric material in the resulting aqueous medium to produce a polymeric product containing said rubbery acrylate coated latex particles encased in a matrix of hard, vinyl chloride resin, said last-named polymeric product containing from about 3 to about 65 percent/wt. of its total weight of said rubbery, gelled acrylate copolymer.

2. The method as defined in claim 1 and further characterized by the intermediate step of coagulating said step (1) latex product to form an aqueous suspension of polymeric material before employment in step (2), by said vinyl chloride resin latex seed particles of step (1) being polyvinyl chloride averaging from about 250 to about 1,250 A in diameter, by said (2) (a) monomeric material consisting entirely of liquid vinyl chloride, and by said step (2) polymerization being a suspension polymerization effected on the coagulated suspension of step (1) polymeric material.

3. The method as defined in claim 1 and further characterized by said step (3) polymerization being a polymerization in aqueous suspension employing an organic peroxygen catalyst soluble in said step (2) (a) monomeric material producing directly a suspension of marco-granular resin in water and by the additional fourth and fifth consecutive steps of (4) blending the step (3) aqueous suspension product with sufficient of an aqueous suspension of a macro-granular hard vinyl chloride resin similar to that deposited in step (3) but not containing a rubbery material to produce a blended suspension of resinous product containing an average of from about 3 to about 6 parts/wt. of said rubbery, gelled acrylate copolymer for every 100 parts/wt. of total vinyl chloride resin therein and (5) dewatering said blended suspension and drying the resulting dewatered polymeric solids.

4. The method as defined in claim 1 and further characterized by said vinyl chloride seed resin particles of step (1) being particles of polyvinyl chloride averaging from about 250 A to about 800 A in average diameter, by said rubbery gelled acrylate copolymer of step (1) being a copolymer of n-butyl acrylate and from about 1 to about 4 percent/wt. of a glycol diester of acrylic or methacrylic acids, by said step (2) (a) monomeric material consisting entirely of liquid vinyl chloride and said step (3) being a polymerization in aqueous suspension in the presence of a said step (2) (b) peroxygen catalyst soluble in said liquid vinyl chloride and a said step (2) (c) colloidally active suspension agent, and by the additional fourth, fifth and sixth consecutive steps of (4) blending the step (3) aqueous suspension of product with sufficient of an aqueous dispersion of macro-granular form of a polyvinyl chloride diluent resin not containing a rubbery material to produce a blended suspension the solids contents of which average from about 3 to about 6 parts/wt. of said gelled butyl acrylate copolymer for every 100 parts/wt. of total polyvinyl chloride therein, (5) dewatering the resulting blended suspension and drying the resulting blended polymeric solids, and (6) masticating the resulting dried blended polymeric solids of step (5) under shear at a temperature between about 350° and about 440°F. to produce a homogenous, fluxed and fused resinous product exhibiting high resistance to impact and containing at least a portion of its content of rubbery, gelled butyl acrylate copolymer as a more or less continuous network distributed through a matrix of hard, rigid polyvinyl chloride.

5. The unmasticated polymerization product of the method of claim 1 in which said gelled acrylate copolymer is present as a more or less continuous network.

6. The unmasticated, blended polymerization product of claim 3.

7. The masticated, blended product of claim 4.

Figure 3:
FIG. 3 is a photomicrograph of a second stage polymerization product may by the process of this invention utilizing a seed latex containing latex particles averaging 1,100 A in diameter with a shell coating of n-butyl acrylate/3 percent diethylene glycol diacrylate (hereinafter "DEGDA") 180 A in thickness, this photomicrograph being taken at 20,000 X magnification on an electron microscope and showing the network-like dispersion of the lighter-colored acrylate rubber in the darker polyvinyl chloride resin.

8. A rigid polymerization product comprising (1) small seed resin nuclei particles averaging between about 250 and 800 A in diameter of a vinyl chloride resin coated with a thin coating of a rubbery, gelled copolymer of an alkyl acrylate averaging between about 125 and about 350 A in thickness, said gelled copolymer being a copolymer of a monomeric material free of conjugated unsaturation and consisting of an alkyl acrylate in which the alkyl group contains from two to four carbon atoms and from about 1 to about 4 percent/wt. of a glycol diester of acrylic or methacrylic acids and said gelled acrylate copolymer being soluble in toluene at room temperature to the extent of less than 10 percent/wt., enclosed in (2) a matrix of hard polyvinyl chloride resin, the said product containing between about 10 percent and about 25 percent/wt. of the said gelled acrylate copolymer dispersed in said product as a more or less continuous network exhibiting at 20,000X magnification an electron microscope photomicrograph similar to that of FIG. 3 of the drawings.

9. A rigid polymerization product comprising (1) small seed resin nuclei particles averaging between about 250 and about 800 A in diameter of a crosslinked vinyl chloride resin coated with a grafted thin coating of a rubbery, gelled copolymer of an alkyl acrylate between about 125 and about 350 A in thickness, said crosslinked vinyl chloride seed resin being prepared by copolymerizing a monomeric material consisting of vinyl chloride and from about 0.25 percent to about 5 percent/wt. of a non-conjugated crosslinking monomer containing at least two $CH_2=C<$ groups per molecule of dissimilar polymerizability with vinyl chloride in aqueous dispersion and said gelled copolymer being prepared from a monomeric mixture free of conjugated unsaturation and consisting of an alkyl acrylate in which the alkyl group contains from two to four carbon atoms and from about 1 percent to about 4 percent/wt. of a glycol diester of acrylic or methacrylic acids and said gelled copolymer being per se soluble in toluene at room temperature to the extent of less than 10 percent/wt., enclosed in (2) a matrix of a hard polyvinyl chloride resin, the said product between about 10 and about 25 percent/wt. of the said gelled acrylate copolymer dispersed in said product as a more or less continuous network exhibiting, at 20,000X magnification, an electron microscope photomicrograph similar to that of FIG. 3 of the drawings.

* * * * *

UNITED STATES PATENT OFFICE
CERTIFICATE OF CORRECTION

Patent No. 3,760,035　　　　Dated September 18, 1973

Inventor(s) PHILIP C. KELLEY

It is certified that error appears in the above-identified patent and that said Letters Patent are hereby corrected as shown below:

Col. 3, line 24, "polymer" should read --copolymer--.
Col. 4, line 61, "blanks" should read --blends--.
Col. 5, line 22, "may" should read --made--.
Col. 9, line 13, insert --is-- at end of line; line 14 delete "sodium polyacrylate,".
Col. 12, line 42, "35°" should read --350°--.
Col. 17, line 18, "recipe" should read --suspension--; line 20-21, delete "recipe".
Col. 22, lines 28-29, "gorups", should read --groups--; line 54 in the "Recipe" "$K_2S_08$" should read --$K_2S_2O_8$--.
Column 23, line 9, "mechacrylate" should read -- methacrylate --.
Column 25, line 17, "marco" should read -- macro --.

Signed and sealed this 10th day of September 1974.

(SEAL)
Attest:

McCOY M. GIBSON, JR.
Attesting Officer

C. MARSHALL DANN
Commissioner of Patents